United States Patent [19]

Karlsson

[11] Patent Number: 4,536,285
[45] Date of Patent: Aug. 20, 1985

[54] ASSEMBLY COMPRISING A VORTEX FLUIDIC DEVICE FOR SEPARATING A MIXTURE OF A LIQUID PHASE AND A RELATIVELY HEAVY, SOLID PHASE

[75] Inventor: Per G. Karlsson, Stockholm, Sweden

[73] Assignee: Alfa-Laval Separation AB, Tumba, Sweden

[21] Appl. No.: 612,374

[22] Filed: May 21, 1984

[30] Foreign Application Priority Data

May 27, 1983 [SE] Sweden ................................. 8302991

[51] Int. Cl.³ ...................... B01D 43/00; B04B 13/00
[52] U.S. Cl. .................................. 210/96.1; 210/512.1
[58] Field of Search .................. 210/96.1, 137, 512.1, 210/512.3, 739, 742

[56] References Cited

U.S. PATENT DOCUMENTS

| 4,163,009 | 7/1979 | Filstrup | 210/96.1 |
| 4,323,452 | 4/1982 | Witzenburg | 210/512.1 |
| 4,366,069 | 12/1982 | Dudrey | 210/512.1 |
| 4,483,774 | 11/1984 | Brill | 210/512.1 |

Primary Examiner—John Adee
Attorney, Agent, or Firm—Cyrus S. Hapgood

[57] ABSTRACT

An assembly comprises a centrifugal separator (1) with a rotor provided with permanent openings, a circulation pump (2) and lines (6, 7) forming a circulation circuit. From this circuit there is a discharge line (8) for separated solid phase fraction from an incoming mixture of liquid and solid substance. In order to control the content of solid substance in the circulation circuit, there is provided a vortex fluidic device (13) in said discharge line (8).

3 Claims, 7 Drawing Figures

ASSEMBLY COMPRISING A VORTEX FLUIDIC DEVICE FOR SEPARATING A MIXTURE OF A LIQUID PHASE AND A RELATIVELY HEAVY, SOLID PHASE

This invention relates to an assembly for separating an incoming mixture of a liquid phase and a relatively heavy, usually solid phase into at least one liquid fraction and one fraction enriched in heavy phase, that is to say heavy phase fraction, consisting of a circulation circuit comprising a centrifugal separator, the rotor of which is provided with at least one outlet from the rotor for heavy phase fraction which has been collected in the radially outer part of the separating chamber of the rotor, the circuit also comprising a transporting device like a circulation pump or paring device and a line for recirculation to the centrifugal separator of at least part of the heavy phase fraction being discharged from the outlet of the rotor, and a discharge line for heavy phase fraction that has not been recirculated from said circulation circuit.

Such assemblies are previously known and comprise a centrifugal separator having a rotor provided with a plurality of circumferential nozzles or with channels which convey the heavy phase fraction collected in the outer part of the rotor (the so-called sludge) to a central paring chamber where the sludge is pared out from the rotor by a paring device.

Assemblies of this type are used when the concentration of heavy phase in the incoming mixture varies considerably or is constantly low, and it is desired to obtain a heavy phase fraction with constantly high concentration of heavy phase. In order to solve this problem in an assembly of the type mentioned above, a control device is utilized which senses the concentration of heavy phase in the circulation line with a sensing means, the control device acting upon a control valve which controls the returned amount of heavy phase. The control valve can be placed either in a part of the circulation circuit that returns heavy phase or in said discharge line for the remaining heavy phase. Several different types of sensing means can be utilized for determining the concentration of heavy phase. A viscosimeter, a turbidimeter or similar instrument can be used. The load on the circulation pump can also be used (if such a device is used) if the flow is continuous and constant, or the pressure in the circulation line can be used as a signal for a control of said type. The drawback with sensing means of the type described is that they are expensive and sensible to disturbances. In those cases where the load or pressure is sensed for the control, there is a risk that if the flow is reduced, for instance due to the blocking of a nozzle in the rotor, this will lead to increasing recirculation which in turn means that the rotor is filled with heavy phase and has to be stopped for cleaning.

The principal object of the present invention is to provide an assembly of the type initially mentioned which is cheap and safe in operation. According to the invention, such an assembly is characterized by a vortex fluidic device arranged to control the flow through said discharge line, the vortex fluidic device being of a type that does not separate the incoming heavy phase fraction further and is designed according to known vortex fluidic device technique in such a way that the flow through the vortex fluidic device increases with increasing viscosity in said fraction and vice versa, a certain overpressure being provided in said line for recirculation of heavy phase fraction, so that a corresponding flow through the vortex fluidic device is achieved.

In one suitable embodiment of the assembly according to the invention, an element is provided in the line for recirculation to the centrifugal separator, downstream from the bifurcation of said discharge line, which element preferably has a variable setting and acts on the flow in such a way that an increasing viscosity in the flow will reduce the flow and vice versa. Thus, the flow in the circulation line upstream from the bifurcation of said discharge line is acted upon, and the control range for the vortex fluidic device is increased.

Vortex fluidic devices were investigated in the 1920's and were observed in the 1960's within a technique which is called in English "fluidic" and in Swedish "fluidistik". Within the fluidic art, definitions well known from electronics are used, such as diode, triode etc. In the assembly according to the invention a simple, operationally safe function is desired, and thus vortex fluidic devices of the diode type are preferred.

The special property of admitting an increasing flow with increasing viscosity is, of course, true with the limitation that too high a viscosity means that the flow resistance will at least dominate in such a way that the flow will be reduced and ceases for that reason.

The invention will now be described more in detail with reference to the accompanying drawings in which.

Figure 1:
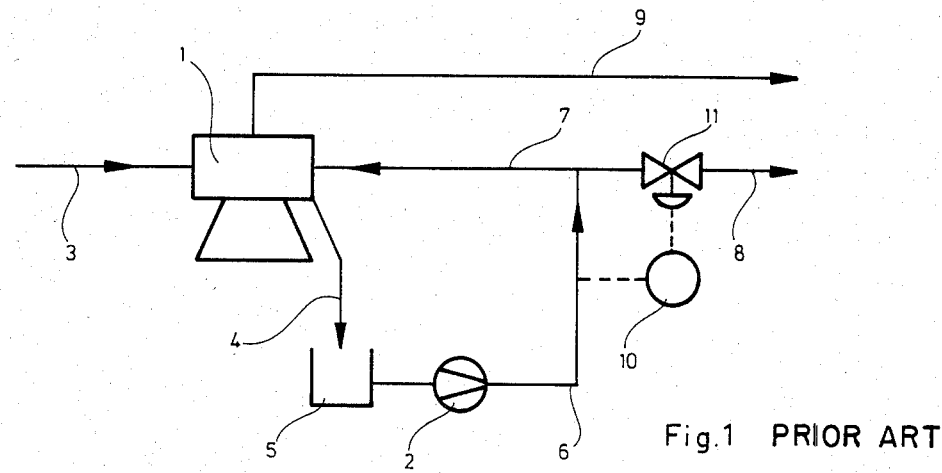
FIGS. 1 and 2 are schematic views of previously known assemblies which form the starting point for the invention.
Figure 2:
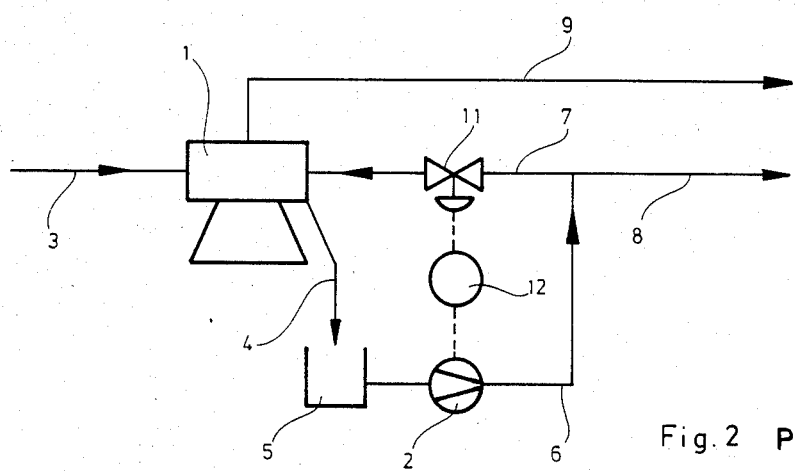
Figure 3:
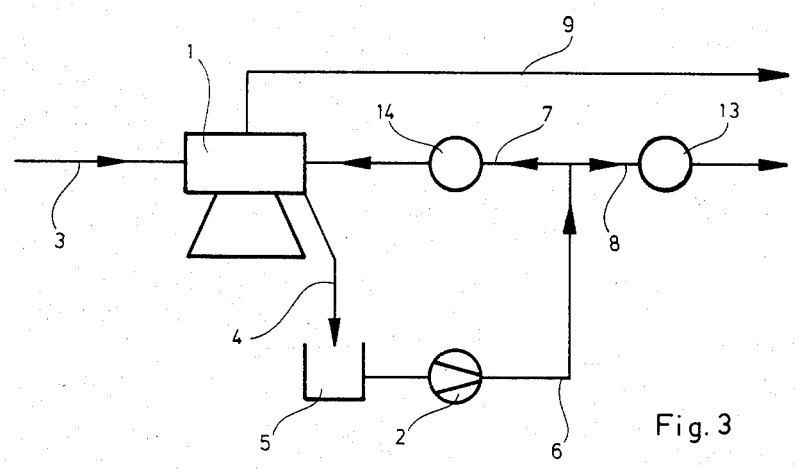
FIG. 3 is a schematic view of an assembly according to the invention.

In FIGS. 1, 2 and 3, the assembly comprises a centrifugal separator 1 having a rotor (not shown) provided with permanent circumferential openings, a circulation pump 2, a feed line 3 for the incoming mixture, a discharge line 4 for heavy phase fraction coming from the rotor, an intermediate tank 5 for heavy phase fraction, lines 6 and 7 in the circulation circuit, a discharge line 8 for heavy phase fraction that is not recirculated, and a line 9 for discharged clear liquid.

In FIG. 1, a controller 10 includes a viscosimeter for sensing changes in the viscosity of the heavy phase flowing through line 6, the controller being connected to valve 11 in discharge line 8. If the viscosity increases, controller 10 acts on valve 11 to increase the flow rate through line 8 and thus reduce the return rate through line 7 to the centrifugal separator, thereby counteracting the viscosity increase. Conversely, a decrease in the viscosity results in an increase in the return rate to the centrifuge, thereby counteracting the viscosity decrease.

In FIG. 2, changes in the load on circulation pump 2 are sensed by a load sensor forming part of a controller 12 connected to a valve 11 in return line 7 to the separator. An increase in the load on pump 2 causes valve 11 to reduce the return rate to separator 1 and vice versa, thereby counteracting the increase or decrease in the load.

In FIG. 3, the assembly according to the invention comprises a vortex fluidic device 13 of the diode type located in discharge line 8, and an element 14 in return line 7 which acts to increase the flow rate with decreased viscosity.

Figure 4:
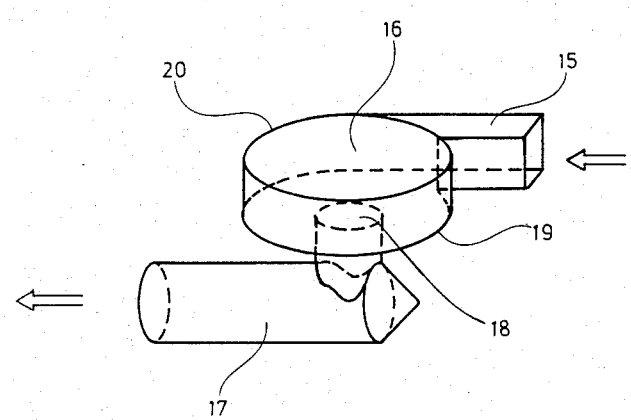
FIG. 4 is a schematic view of a vortex fluidic device of diode type.
Figure 5:
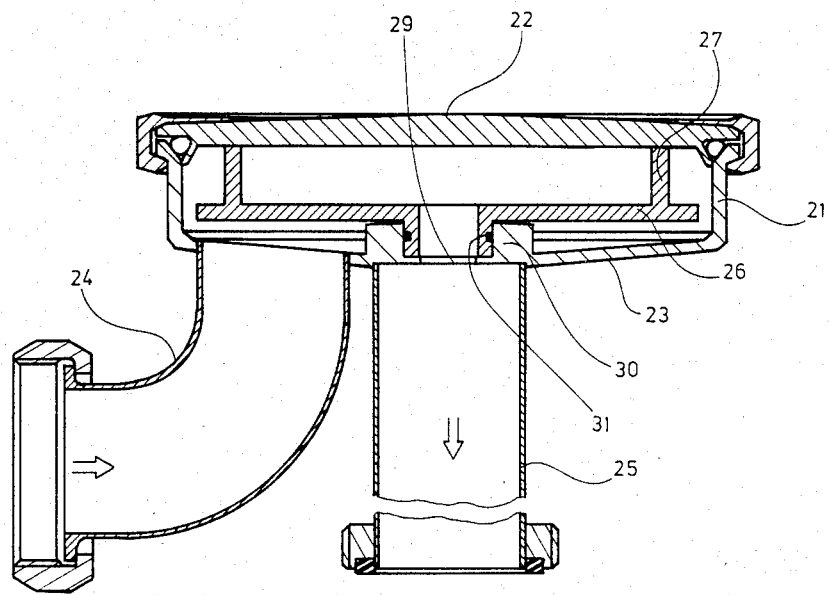
FIG. 5 is a longitudinal sectional view of an embodiment of a vortex fluidic device for an assembly according to the invention.
Figure 6:
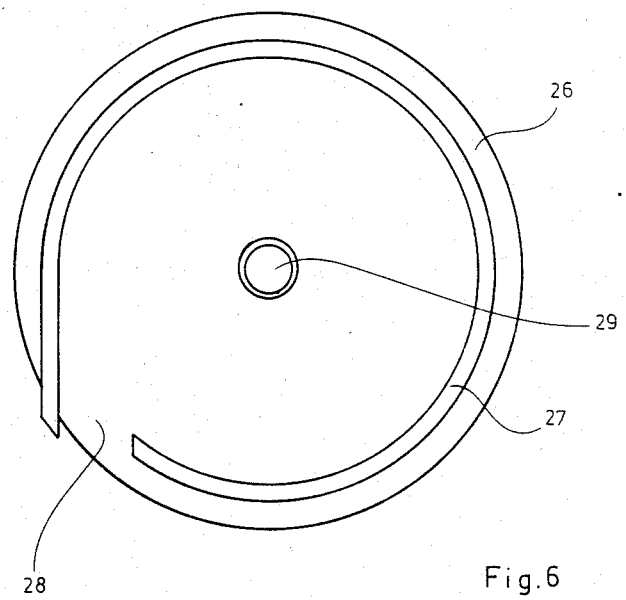
FIG. 6 shows a detail of the device in FIG. 5, seen from above.

An example of the vortex fluidic device 13, as shown in FIG. 4, comprises a tangential inlet channel 15, a vortex chamber 16 and an outlet channel 17 leading from a central outlet 18 in one of the gables 19 of the vortex chamber. The other gable 20 is closed in the utilized design. The vortex fluidic device in FIG. 5 consists of a cylindrical housing 21 provided with a detachable cap 22. In the lower fixed gable 23 of housing 21 is an inlet 24 and a central outlet 25. The vortex fluidic device is formed by an insert consisting of a gable 26, a wall element 27 and said cap 22, which forms a gable. The insert is provided with a tangential inlet 28 and a central outlet 29. The insert is sealed against a connection piece 30 in the gable 23 by a sealing ring 31. The advantage with an embodiment like the one in FIG. 5 is that the insert can be dimensioned within a wide range, so that an assembly of the type initially mentioned can be used within a wide range of capacity and in applications with quite different contents of solid phase.

Figure 7:
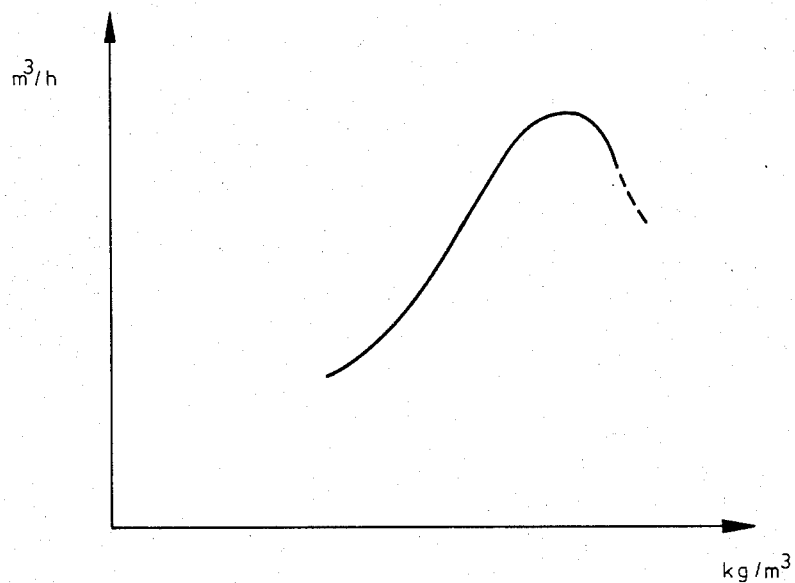
FIG. 7 is a graph showing the relationship between flow (m$^3$/h) and dry solids content (kgs/m$^3$) in a vortex fluidic device of the diode type.

FIG. 7 shows the relationship between flow and dry solids content (content of heavy phase) for such a vortex fluidic device. It is obvious that within a certain range of dry solids content the flow will increase with increasing dry solids content. Of course, there is an upper limit where the flow ceases due to too high a dry solids content.

The vortex fluidic device 13 should always be given a size corresponding to the desired flow and the relevant range of heavy phase content, and with a view to the relationship between heavy phase content and viscosity for the actual mixture that is to be separated. The assembly according to the invention is designed in such a way that the vortex fluidic device or parts thereof can easily be replaced according to demand.

It will give an advantage, however, if the assembly is also provided with an element 14, especially if this is given such a size that the flow through it will be laminar (that is, Reynold's number is relatively low). Under these circumstances, the pressure drop over the element will in principle be proportional to the viscosity of the stream, if only the viscosity is accounted for.

At turbulent flow, the pressure drop over the element 14 (when only the viscosity of the stream is accounted for) will depend to a far minor extent on viscosity (~visc. exp., where exp. is a FIGURE of the order 0.2–0.3). By this arrangement, a single vortex fluidic device can be used within a relatively wide range, regarding flows and content of heavy phase in the streams.

Thus the assembly operates in such a way that an incoming mixture of a liquid and a heavy phase is separated in centrifugal separator 1, and the heavy phase fraction discharged through discharge line 4 is pumped by circulation pump 2 to line 6, which is divided into lines 7 and 8. At a certain content of heavy phase in the mixture fed through line 3, the return rate through line 7 to separator 1 will maintain the discharged heavy phase at a certain viscosity. If the content of heavy phase in the feed mixture increases so as to increase the viscosity of the discharged heavy phase, the flow rate through the vortex device 13 will increase and thus decrease the return rate to separator 1, and vice versa. Thus a substantially constant viscosity is maintained in circulation circuit 1, 4, 5, 6, 7, 14 and 1, regardless of changes in the heavy phase content of the incoming feed mixture.

I claim:

1. In an assembly comprising a centrifugal separator having an inlet for a mixture of a liquid phase and a relatively heavy phase, the separator having a first outlet for a separated liquid phase fraction and a second outlet for a separated heavy phase fraction, the assembly also comprising a recirculation line, means for returning to the centrifugal separator through said line at least part of the heavy phase fraction discharged from said second outlet, and a discharge line for heavy phase fraction discharged from said second outlet but not returned to the separator, the improvement which comprises a vortex fluidic device in said discharge line for controlling the flow therethrough, said vortex device having an inlet and an outlet for discharging all the heavy phase fraction entering said last inlet, said vortex device being of the type in which the flow rate therethrough increases with increasing viscosity of the flowing material and vice versa, said assembly being operable through said vortex device to reduce the return rate of heavy phase fraction to the separator in response to an increase in the viscosity of the separated heavy phase fraction from said second outlet of the separator and vice versa.

2. The assembly of claim 1, in which said returning means include a pump in said recirculation line.

3. The assembly of claim 1, comprising also a flow control element in said recirculation line and located downstream from a region where said discharge line branches from said recirculation line, said element being operable to reduce the flow rate therethrough in response to an increasing viscosity and vice versa.

* * * * *